United States Patent
Gurol et al.

(10) Patent No.: US 6,531,065 B2
(45) Date of Patent: Mar. 11, 2003

(54) PERCHLORATE REMOVAL METHODS

(75) Inventors: Mirat D. Gurol; Kyehee Kim, both of San Diego, CA (US)

(73) Assignee: San Diego State University Foundation, San Diego, CA (US)

( * ) Notice: Subject to any disclaimer, the term of this patent is extended or adjusted under 35 U.S.C. 154(b) by 52 days.

(21) Appl. No.: 10/023,573

(22) Filed: Dec. 17, 2001

(65) Prior Publication Data

US 2002/0084229 A1 Jul. 4, 2002

Related U.S. Application Data

(63) Continuation of application No. 09/442,837, filed on Nov. 18, 1999, now abandoned.
(60) Provisional application No. 60/165,290, filed on Nov. 12, 1999.

(51) Int. Cl.$^7$ .................................................. C02F 1/28
(52) U.S. Cl. ........................ 210/669; 210/683; 210/719; 210/724; 210/748; 210/757; 210/902
(58) Field of Search .......................... 210/631, 669, 210/681, 683, 716, 717, 719, 724, 748, 757, 902

(56) References Cited

U.S. PATENT DOCUMENTS

| | | | |
|---|---|---|---|
| 3,960,723 A | 6/1976 | Butler ........................ 210/42 S |
| 4,382,865 A | 5/1983 | Sweeny ....................... 210/743 |
| 4,732,688 A | 3/1988 | Bryan et al. ................. 210/753 |
| 4,764,286 A | 8/1988 | Bon et al. .................... 210/757 |
| 5,167,777 A | 12/1992 | Kaczur et al. ............... 204/129 |
| 5,190,659 A | 3/1993 | Wang et al. ................. 210/663 |
| 5,258,124 A | 11/1993 | Bolton et al. ................ 210/748 |
| 5,266,213 A | 11/1993 | Gillham ...................... 210/747 |
| 5,741,427 A | 4/1998 | Watts et al. ................. 210/747 |
| 5,879,555 A | 3/1999 | Khudenko ................... 210/615 |
| 5,948,260 A * | 9/1999 | Attaway et al. ............. 210/603 |
| 6,024,882 A | 2/2000 | McNeilly et al. ........... 210/759 |
| 6,039,882 A | 3/2000 | Wolfe et al. ................. 210/747 |
| 6,077,429 A | 6/2000 | Frankenberger et al. .... 210/605 |

FOREIGN PATENT DOCUMENTS

| | | |
|---|---|---|
| EP | 0 699475 | 3/1996 |
| GB | 1183221 | 3/1970 |
| WO | WO 85/05099 | 11/1985 |
| WO | WO 93/10049 | 5/1993 |

OTHER PUBLICATIONS

Ozdemir M. et al. (1997). *Water Research* 31(2):343–345.
Betts et al. *Environmental Science & Technology News* (1998) 10:454–455.
Kim, K. "Investigation of Perchlorate Removal in Drinking Water Sources by Chemical Methods", A Thesis Presented to the Faculty of San Diego State University (In partial fulfillment of the requirements for the degree Master of Science in Civil and Environmental Engineering), 1999 (Summer): 1–84.
Kim, K. and Gurol, M. "Investigation of perchlorate removal in drinking water systems", Annual Conference Proceedings, Chicago, Jun. 20–24, 1999.

(List continued on next page.)

*Primary Examiner*—Peter A. Hruskoci
(74) *Attorney, Agent, or Firm*—Morrison & Foerster LLP (57) ABSTRACT

Disclosed herein are chemical methods for reducing concentrations of perchlorate ion in sources of water to be used for potable purposes. The disclosed methods include contacting water containing perchlorate ion with iron metal to chemically reduce the perchlorate ion to a more innocuous ion species. The metal can then be removed. The instant methods also relate to contacting perchlorate contaminated water with iron metal or a metal oxide in the presence of phosphoric acid to form a complex with perchlorate ion and adsorb the complex onto the iron, which is then removed from the water. These methods provide an environmentally safe and economically efficient means to effectively remove perchlorate ion from potable water sources, resulting in water that is safe for human use and consumption.

16 Claims, 5 Drawing Sheets

In acidic conditions (pH < 6), iron (oxide) surface becomes positively charged, and attracts negatively charged ions.

OTHER PUBLICATIONS

Kim, K. and Gurol, M. *"Investigation of perchlorate removal in drinking water sources by chemical methods."* In Perchlorate in the Environment (Edited by E.T. Urbansky), Kluwer Academic/Plenum Publishers, New York, 2000, pp. 99–107.

Wirt et al. *American Environmental Laboratory* (1998) 10(3): 4–5.

Betts et al. *Environmental Science & Technology News* (1998) 10:454–455.

Kim, K. "Investigation of Perchlorate Removal in Drinking Water Sources by Chemical Methods", A Thesis Presented to the Faculty of San Diego State University (In partial fulfillment of the requirements for the degree Master of Science in Civil and Environmental Engineering), 1999 (Summer): 1–84.

Wirt et al. *American Environmental Laboratory* (1998) 10(3):4–5.

* cited by examiner

In acidic conditions (pH < 6), iron (oxide) surface becomes positively charged, and attracts negatively charged ions.

PERCHLORATE REMOVAL METHODS

This application is a continuation of Ser. No. 09/442,837 filed Nov. 18, 1999, now ABN which claims benefit of Provisional Application Ser. No. 60/165,290 filed Nov. 12, 1999.

BACKGROUND OF THE INVENTION

1. Field of the Invention

The instant invention relates to novel processes for the treatment of water. The invention is particularly concerned with processes for reducing the concentration of perchlorate ion from potable water sources.

2. Description of the Related Art

Perchlorate chemicals have been produced commercially in United States since the mid-1940s. Although several different perchlorate salts are manufactured, ammonium perchlorate, for example, is produced almost exclusively as an oxidizer in propellants for solid rocket motors. It is estimated that 90 percent of all perchlorate is used for this purpose. Other perchlorate salts are used in the manufacturing of explosives, fireworks and matches.

However, perchlorate production and processing methods may provide sources of groundwater pollution. Disposal of perchlorate, from manufacturing or utilization sites may occur through aqueous waste tailings, contaminated solid waste or atmospheric deposition. Deposition of these perchlorate-containing materials, usually in ponds, lakes or lagoons, or in hazardous waste landfills, provide direct pathways for groundwater contamination. For example, a primary source of perchlorate contamination is the process used to remove and recover propellant from solid rocket motors. This process consists of a high-pressure water washout of the residual propellant and generates a large quantity of ammonium perchlorate-containing wastewater, some of which enters the ground during processing by spillage. Another historic source of perchlorate contamination results from the limited "shelf life" of ammonium perchlorate, necessitating frequent replacement and disposal of old stocks since the 1950's.

Perchlorate has increasingly been found in sources of potable water. Several states have had confirmed perchlorate contamination in ground water and surface water. The concentration of perchlorate reported in wells and surface water varies widely. For example, in both northern and southern California, perchlorate was detected in 144 public water supply wells (December, 1998) with 38 of these having concentrations greater than a provisional action level of 18 ppb. The highest level of perchlorate reported in any public water supply well was 280 ppb with others greater than 100 ppb. At manufacturing facilities, perchlorate concentrations in groundwater monitoring wells were measured as high as 3.7 million ppb (US Environmental Protection Agency. "Perchlorate Environmental Contamination: Toxicological Review and Risk Characterization Based on Emerging Information." (NCEA 1-0503) Washington, D.C., Office of Research and Development, 1998).

The primary health concern related to perchlorate contamination is interference with the thyroid gland's ability to utilize iodine to produce thyroid hormones. The basis for the effect on thyroid hormone function is the competitive inhibition between iodide anion and perchlorate anion ($ClO_4^-$) for thyroid gland uptake, which then results in reduced thyroid hormone production. Thyroid hormones are implicated in a number of metabolic and regulatory processes. In this regard, perchlorate causes problems for normal body metabolism, growth and development through its affect on thyroid hormone regulation.

In view of the possible negative effects towards thyroid-regulated processes, methodologies have been developed to remove perchlorate ion from drinking water. To be considered as a viable drinking water treatment technology, a process must satisfy the following criteria: (i) it must be technically capable of removing targeted pollutant(s), (ii) it must be cost-effective, (iii) it must be acceptable to the regulatory agencies and the public, (iv) it should not cause any water quality or environmental problems, and (v) it should keep waste generation to a minimum.

Ion exchange and reverse osmosis have been shown to remove perchlorate from water. Ion exchange systems, in which the perchlorate ion is replaced by an innocuous anion, e.g., chloride, has received considerable attention. These systems are capable of removing perchlorate from 20–75 ppb to nondetectable levels, such as below 4 ppb. In addition, reverse osmosis can remove between 20 and 1000 ppb of perchlorate from contaminated water with removal efficiencies upwards of 97% (Betts et al. "Rotating Ion-Exchange System Removes Perchlorate." Environmental Science & Technology News October (1998): 454–455). However, ion exchange and reverse osmosis processes are non-selective and remove other ions which are typically present in far higher concentrations than perchlorate, e.g., chloride, sulfate, bicarbonate. In addition, present perchlorate removal methods generate perchlorate-rich waste brines that require costly disposal.

Removal of toxins through biodegradation is expected to be one of the most cost-effective methods for removing perchlorate from drinking water. Effort has been directed at developing an anaerobic biochemical reduction processes for perchlorate ion. However, the major anticipated problem with biological processes is that biodegradation is usually too slow, especially for low level contaminants.

Another approach to remove perchlorate is by chemically treating contaminated water such that perchlorate is chemically converted to a less toxic product. However, perchlorate is known to be unreactive towards most conventional reducing agents due to slow reaction kinetics and the stability of perchlorate ion makes treatment technologies difficult, especially at low concentration levels. Further, perchlorate is a highly oxidized compound and the chemical reaction between perchlorate and commonly used reducing agents, e.g., thiosulfate, sulfite, iodide, and ferrous ion is too slow to be of practical use. Lastly, many reducing agents including titanium, vanadium, molybdenum, or ruthenium are likely to be too unstable or toxic to be used for a drinking water treatment regimen.

Accordingly, there is a need to develop new and more effective methods for removing perchlorate from water, particularly water intended for potable purposes. Methods that are efficient, safe and inexpensive are particularly desired.

SUMMARY OF THE INVENTION

It is therefore an object of the instant invention to provide new and more efficient methods for removing perchlorate ion from water by chemically treating the water, thereby converting perchlorate to a less toxic product.

It is also an object of the instant invention to provide methods for physically removing perchlorate from water that is both environmentally safe and cost effective.

In accomplishing these and other objectives, there has been provided, in accordance with one aspect of the invention, a method for chemically reducing perchlorate ion concentration in water comprising contacting water containing perchlorate ion with an effective amount of iron metal.

In a preferred embodiment, the effective amount of iron metal is about 10 g/L to about 100 g/L.

In another preferred embodiment, the step of contacting the water with iron metal is performed in the presence of a catalyst, wherein the catalyst is preferably UV light.

In yet another preferred embodiment, the step of contacting the water with iron metal is performed under substantially anoxic conditions.

In still yet another preferred embodiment, the step of contacting the water with iron metal is performed at a pH of about 6 to 8.

In yet another embodiment, the iron metal is in a powdered form or the iron metal is contained within a packed bed.

There is also provided, in accordance with another aspect of the invention, a method for removing perchlorate ion from water comprising contacting the water containing perchlorate ion with iron metal or metal oxide in the presence of phosphoric acid under conditions suitable for perchlorate to adsorb to the iron metal or metal oxide and the removing the iron metal or metal oxide with perchlorate ion bound thereto from the water.

In a preferred embodiment, the iron metal or metal oxide is present at a concentration of about 10 g/L to about 100 g/L.

In another preferred embodiment, the iron meal is an iron oxide.

In yet another preferred embodiment, the iron oxide is FeOOH.

In still yet another preferred embodiment, step of contacting the water containing perchlorate ion with iron metal or metal oxide is performed at under acidic conditions.

In again yet another preferred embodiment, the phosphoric acid is in stoichiometric excess with respect to the perchlorate ion, and even more preferably, the ratio of phosphoric acid to perchlorate ion is between about 1:1 to about 70:1.

There is also provided, in accordance with still yet another aspect of the invention, a method for removing perchlorate ion from water, comprising contacting water containing perchlorate ion with phosphoric acid under conditions suitable to form a perchlorate ion-phorphoric acid complex, passing the water through a column packed with iron metal or metal oxide, wherein the iron metal or metal oxide is immobilized within the column and wherein passing the water through the column brings the water into contact with the iron metal or metal oxide such that formed perchlorate ion-phorphoric acid complex adsorbs to the iron metal or metal oxide, and collecting the water after it passes through the column.

Other features and advantages of the present invention will become apparent from the following detailed description. It should be understood however that the detailed description and the specific examples, while indicating preferred embodiments of the invention, are given by way of illustration only, since various changes and modifications within the scope of the invention will become apparent to those skilled in the art from the following detailed description.

BRIEF DESCRIPTION OF THE DRAWINGS

FIG. 1.0 Proposed mechanism for the $Fe^0$—$H_3PO_4$—$ClO_4^-$ and FeOOH—$H_3PO_4$—$ClO_4^-$ systems.

FIG. 2.0 Change of perchlorate concentration by iron metal.

FIG. 3.0 Change of perchlorate concentration by iron metal and UV light.

FIG. 4.0 The effect of UV intensity on change of perchlorate concentration.

FIG. 5.0 The effect of initial solution pH on the change of perchlorate concentration in $Fe^0$-UV systems.

FIG. 6.0 Change of perchlorate concentration and pH by iron metal and phosphoric acid.

FIG. 7.0 Filtration effect on the perchlorate concentration in the iron metal and phosphoric acid system.

FIG. 8.0 Change of perchlorate concentration and pH by FeOOH and phosphoric acid.

FIG. 9.0 The effect of phosphoric acid on the removal of perchlorate.

FIG. 10.0 The effect of initial perchlorate concentration on the removal of perchlorate.

DETAILED DESCRIPTION OF THE PREFERRED EMBODIMENTS

By the following description, the instant invention contemplates, at least, two embodiments, embodiments I and II, for the efficient, safe and inexpensive removal of perchlorate from sources of water.

In embodiment I, the invention contemplates the ability of iron metal to remove perchlorate ion from water by chemically reducing perchlorate ion with iron metal, thus effectively converting perchlorate ion to a less toxic chemical species. Iron metal, as is used in the context of the instant invention, includes zero valent iron or $Fe^0$. However, the invention does not exclude iron metal in mixtures with other metals or mineral oxides.

Perchlorate is reduced by contacting contaminated water with an effective amount of iron metal. An effective amount of iron metal is that amount needed to reduce a given concentration of perchlorate to below a desired concentration, such as, for example, about 20 ppb. In general, increased perchlorate removal correlates with increased iron metal concentration and a concentration of iron metal that is effective is determined by the initial concentration of perchlorate. In general, an effective concentration of iron metal for chemically reducing perchlorate is about 1 g/L to about 100 g/L, preferably about 40 g/L to about 100 g/L and even more preferably 70 g/L to about 100 g/L.

The form of iron metal added is not critical and is preferably a powdered form such as a 80 to 100 mesh powder. Other forms of iron metal useful to chemically reduce perchlorate ion can include iron granules or iron filings. The iron metal in a given form may circulate freely in a system or be present within the confines of a packed bed.

Chemical reduction of perchlorate by iron metal occurs in water with a starting pH of about 6 to 7 and an ending pH (the pH at the completion of the reaction) of about 8 to 8.5. A highly basic pH may favor the formation of precipitates, such as iron hydroxide, which may eventually inhibit the reaction. Preferably, the pH of the reaction is maintained between about 6.0 to about 8.5, more preferably about 6.2 to about 7.5.

The temperature of the reaction may be at room temperature or approximately 25° C. It is also preferable that the reaction be kept under substantially anoxic conditions, which means that the reaction conditions are preferably substantially free of oxygen.

Without the intention of being bound by theory, it is believed that embodiment I involves reduction of perchlorate by electron transfer from the $Fe^0$ surface to the adsorbed chlorine-inorganic compounds. In this regard, two hypothetical reactions of iron metal with perchlorate ion may be as follows:

Case I $Fe^° \leftrightarrow Fe^{2+} + 2e^-$ $\Delta G° = -20.31$ kcal/mol $ClO_4^- + 8H^+ + 8e^- \leftrightarrow Cl^- + 4H_2O$ $\Delta G° = -256.47$ kcal/mol Balanced equation:

$4Fe^° + ClO_4^- + 8H^+ \leftrightarrow 4Fe^{2e} + Cl^- + 4H_2O$ $\Delta G° = -337.71$ kcal/mol Case II $Fe^° \leftrightarrow Fe^{2+} + 2e^-$ $\Delta G° = -20.31$ kcal/mol $ClO_4^- + 2H^+ + 2e^- \leftrightarrow ClO_3^- + H_2O$ $\Delta G° = -54.88$ kcal/mol Balanced equation:

$Fe^° + ClO_4^- + 2H^+ \leftrightarrow ClO_3^- + Fe^{2+} + H_2O$ $\Delta G° = -75.19$ kcal/mol Both reactions are thermodynamically favorable, as indicated by a negative $\Delta G°$ value. This means that they should take place, more or less, spontaneously. However, perchlorate ion originates as a contaminant in ground and surface waters from the dissolution of its ammonium, potassium, magnesium, or sodium salts. The resultant anion ($ClO_4^-$) can persist for many decades under typical groundwater and surface water conditions. In this regard, perchlorate is a kinetically stable ion, which means that reduction of the chlorine atom from a +7 oxidation state in perchlorate, to -1 or +5 oxidation state, as chloride or chlorate ion, does not occur readily.

Although perchlorate reduction with iron metal, according to the instant embodiment of the invention, converts perchlorate ion to another species, further promotion by a catalyst will reduce kinetic barriers and facilitate efficient conversion by chemical reduction to a less toxic chemical species, thereby increasing the efficiency at which perchlorate ion is chemically converted. Therefore, according to one aspect of embodiment I, a catalyst is used to selectively speed the conversion of perchlorate ion, thereby, potentiating the effect of a reducing agent to chemically convert perchlorate, thereby removing perchlorate from water.

As used herein, a "catalyst" is any substance or material which accelerates the chemical reduction of perchlorate by iron metal. Within the context of the instant invention, a catalyst also can be a source of energy such as either light or heat. Preferably, an energy catalyst is ultraviolet light (UV light) which is light of the spectrum just beyond the violet, on the short-wavelength side. In particular, UV light is light with wavelengths in the range of about 110 to about 4000 Å and is emitted, for example, by sunlight or the carbon, mercury-vapor and tungsten lamps in a preferred catalyst herein.

It has been discovered that by irradiation with UV light, together with iron metal, the instant invention is able to accelerate chemical reduction of perchlorate. The UV light may act as a catalyst which makes the reaction faster, or as an energy input which excites perchlorate ion. In this regard, the role of UV light might be to activate perchlorate ion from its ground state to an excited state and thus accelerate chemical reduction of perchlorate ion. Accordingly, embodiment I also includes methods for removing perchlorate ion from water comprising contacting water containing perchlorate ion with an effective amount of iron metal in the presence of a catalyst, preferably UV light. The intensity of the UV light may directly influence chemical reduction of perchlorate ion with iron metal, with higher light intensities generally correlating with higher rates of perchlorate ion chemical reduction and removal through conversion to a less toxic chemical species.

It is also preferable in embodiment I to remove the added iron metal once the chemical reduction of perchlorate ion to a less toxic chemical species is substantially complete. Iron metal can be removed from the water by any of a variety of means of solids removal well known in the art, including, for example, simple filtration with an appropriate mesh filter, gravity settling, granular media filtration, centrifugation, or by application of a magnetic field.

Embodiment II comprises methods of removing perchlorate ion from water comprising contacting water containing perchlorate ion with iron metal or metal oxide in the presence of phosphoric acid and then under conditions that allow the perchlorate to adsorb to the metal. Once adsorbed, then removal of the metal from the water results in removal of perchlorate from the water. Although not intending to be bound by any theory, it is believed that perchlorate complexes with phosphoric acid, which is readily adsorbed to the surface of the iron metal or metal oxide.

A particularly preferred metal oxide is iron oxide. As used herein, an iron oxide is any material containing combinations of either iron and oxygen, or iron, oxygen, and hydrogen. This includes materials containing substantially iron and oxygen, materials containing substantially iron and hydroxide groups, and materials containing iron with combinations of oxygen and hydroxide groups, i.e. iron oxide hydroxides. Preferably, the iron oxide of the instant invention is FeOOH, since it exhibits good adsorbant properties for phosphates.

In general, with respect to embodiment II, iron metal or metal oxide concentrations in contaminated water correlates with increased perchlorate removal. The concentrations of iron metal or iron oxide to be added is determined by the initial concentrations of perchlorate in the water. In general, an effective concentration of iron metal or metal oxide in embodiment II is between about 1 g/L to about 100 g/L.

Figure 1:
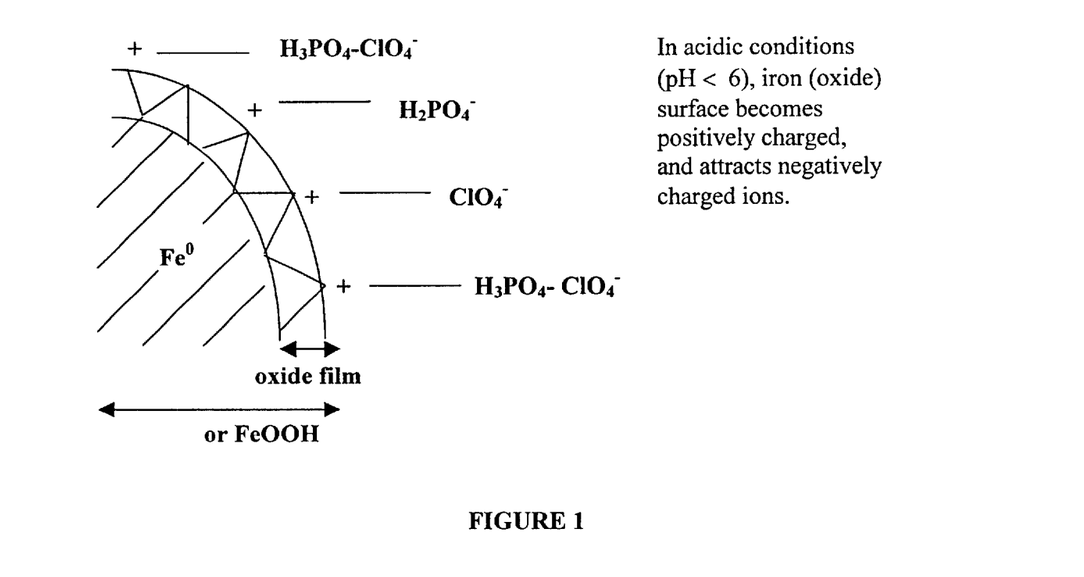
Figure 2:
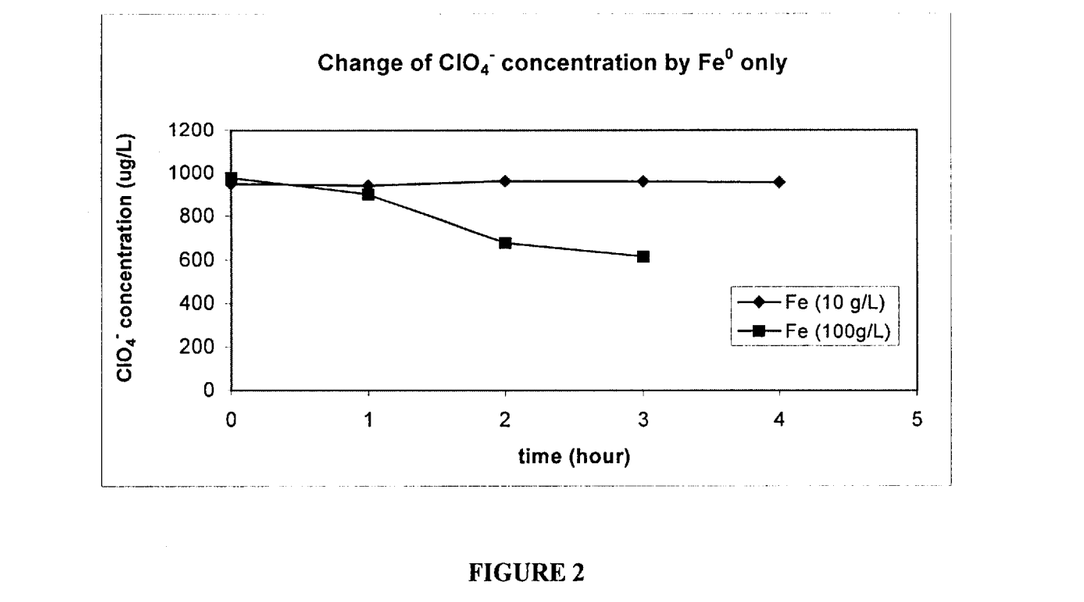
Figure 3:
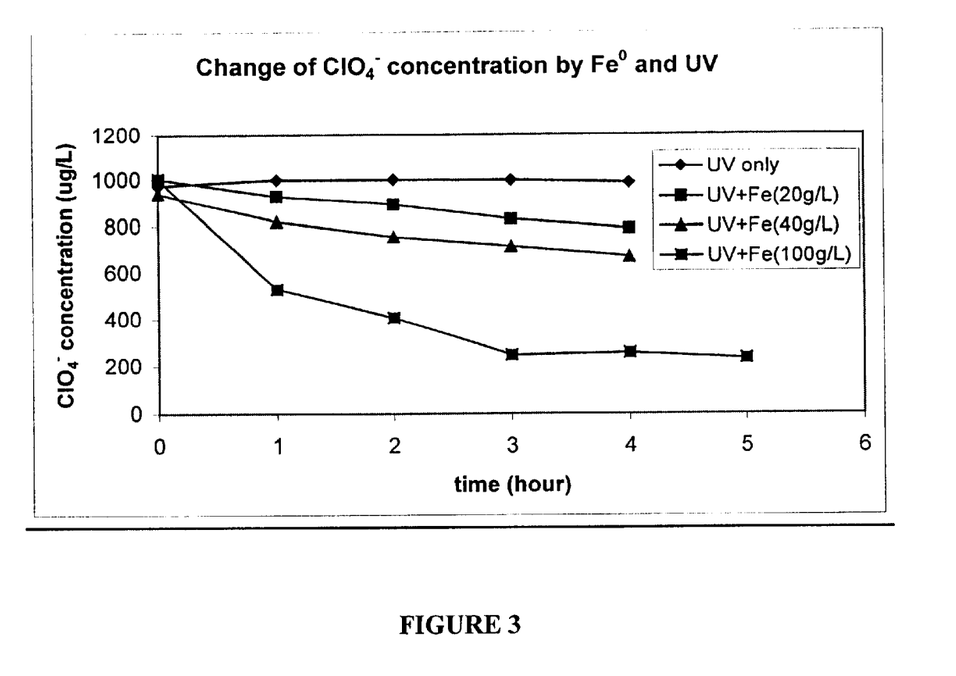
Figure 4:
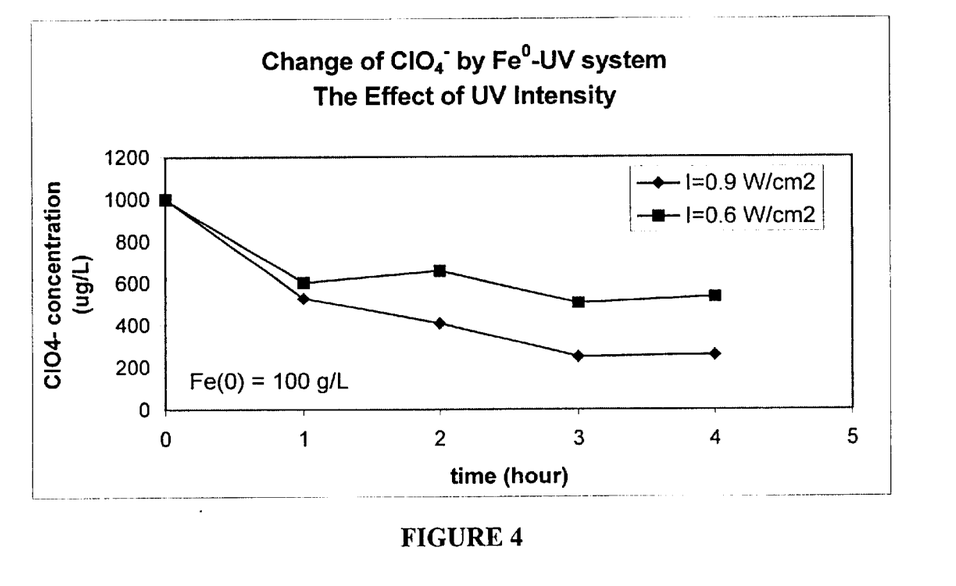
Figure 5:
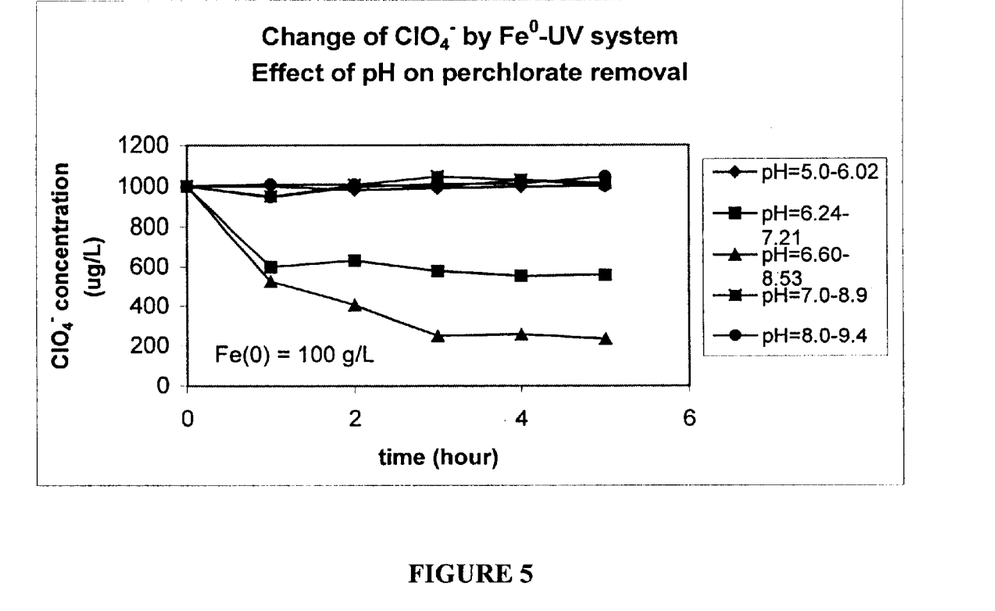

Within the contemplation of embodiment II, iron oxides, in the presence of water, are covered with surface hydroxyl groups and can be considered as polymeric oxy-acid or bases. For example, the surface charge of FeOOH, α-FeOOH, changes with the pH of the solution:

$\equiv FeOH_2^+ \leftrightarrow H^+ + \equiv FeOH$   $pK_1 = 6$ $\equiv FeOH_2 \leftrightarrow H^+ + \equiv FeO^-$   $pK_2 = 8.8$ Also, $H_3PO_4$ stays in various forms in aqueous solution based upon pH:

$H_3PO_4 \leftrightarrow H^+ + H_2PO_4^-$   $pK_{a1} = 2.1$ $H_3PO_4 \leftrightarrow H^+ + HPO_4^{2-}$   $pK_{a2} = 7.2$ $HPO_4^{2-} \leftrightarrow H^+ + PO_4^{3-}$   $pK_{a3} = 12.3$ Accordingly, embodiment II is preferably conducted in acidic conditions, generally in a pH range of about 2.0 to about 5.0. Acidic conditions advantageously cause the surface of iron and iron oxide to be positively charged (see FIG. 1). It is believed that positively charged iron metal or iron oxide surface will more effectively adsorb phosphate-perchlorate complex. In this regard, it is appreciated that because charge plays an important role in adsorbing the perchlorate ion-phosphoric acid complex, other common metal oxides in solid or powder form such as an aluminum or manganese-based metal oxide also can be used to adsorb perchlorate ion-phosphoric acid complex and remove it from water.

Figure 10:
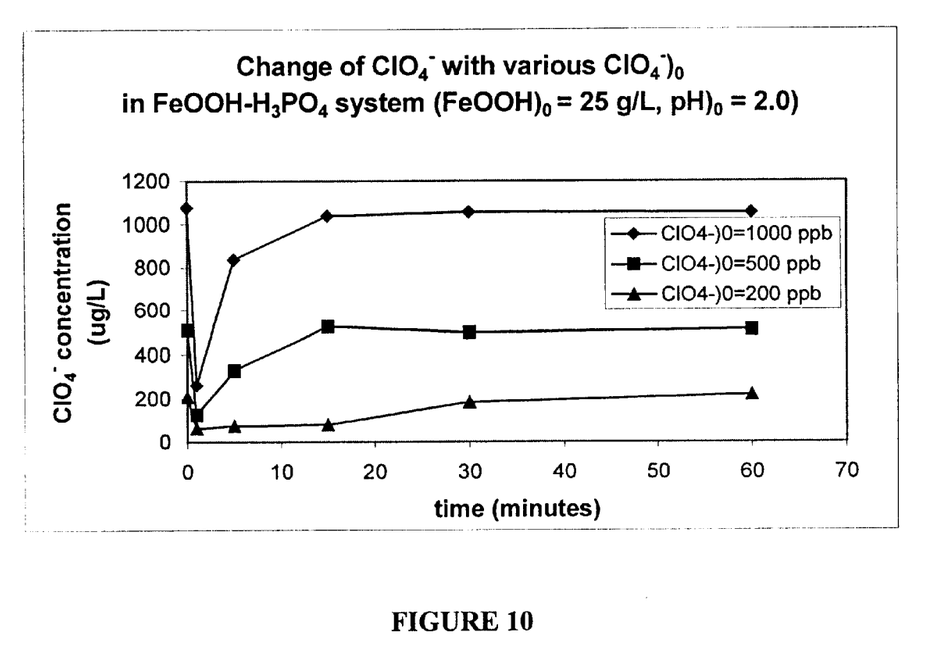

In embodiment II, phosphoric acid is preferred to other acids such as hydrochloric acid or sulfuric acid because phosphoric acid provides both acidic conditions and the phosphate for complexation with perchlorate. In acidic conditions, $H_3PO_4$ is preferred to other orthophosphates as the predominant phosphate in solution. As shown in FIG. 1.0, $H_3PO_4$ and $ClO_4^-$ complexation has the total charge of −1 and is possible to be adsorbed to the positively charged iron oxide surface. In addition, $H_3PO_4$ is a very active adsorbate when iron oxides are positively charged. Other less desired orthophosphates include those that do not provide acidic conditions or which compete with perchlorate complexes for surface sites (e.g., $H_2PO_4$), as shown in FIG. 1.0

In general, phosphoric acid is added such that it is in stoichiometric excess of perchlorate ion in order to achieve the desired removal of perchlorate. Many of the compounds potentially present in solution, such as, ligands, phosphates, hydroxides, and carbonates are potent complex formers, while perchlorate shows very little tendency to form complexes. Therefore, unless a large excess of phosphoric acid is added, other ions may complex first, leaving perchlorate ion free in solution. Preferably, the stoichiometric ratio of phosphoric acid to perchlorate ion in water is between about 1:1 to about 70:1.

The step of removing the iron metal or iron oxide can be accomplished by any known methods for solids removal. For example, removal can be effected by simple filtration with an appropriate mesh filter, gravity settling, granular media filtration or centrifugation.

As shown in Examples 5 and 6 and FIGS. 6.0 and 7.0, the iron metal or metal oxide needs to be removed relatively rapidly from the perchlorate contaminated water after addition of phosphoric acid in order to effectively remove perchlorate from the water. The metal is preferably removed within about 30 minutes, more preferably within about 15 minutes, and most preferably within about 5 minutes after addition of phosphoric acid.

Separation of particles may be eliminated entirely in embodiment II, for example, by first treating the water with phosphoric acid to allow for formation of perchlorate ion-phosphoric acid complexes and then passing water over a column packed with iron metal or a metal oxide. The iron metal or metal oxide solid is restrained in the column typically by mesh screening. If desired, a magnetic field also can be used to assist in removal of iron metal from the water.

The present invention, thus generally described, will be understood more readily by reference to the following examples, which are provided by way of illustration and are not intended to be limiting of the present invention.

Materials and Methods

The iron metal, $Fe^0$ used in the experiments was an electrolytically-produced 100 mesh powder (certified grade, 95%; Fisher) with surface area of 0.74 m²/g. The iron oxide, FeOOH, was a hydrated, 30–50 mesh powder (catalyst grade; Aldrich Chemical Co.) with surface area of 120 m²/g. For the study of the effect of UV radiation on perchlorate reduction, quartz reactor of 0.8 L was used with a RAYO-NET Photochemical Reactor, which contains 16 low pressure mercury lamps producing a light intensity, 1% of which is at 185 nm, and 99% at 254 n. The chamber accommodated sixteen low pressure mercury lamps, with a total emitted light intensity of 26 watts, and an incident light intensity of 3.4 watts, as measured by actinometry. For the continuous circulation of solution and iron metal, a MASTERFLEX hydraulic pump with the speed of 60–600 rpm (Cole-Palmer) was used. After sampling, to remove the residual particles of iron metal or iron oxide from the samples, a 0.45 μm filter (Micron separations Inc.) was used.

Experiments with $Fe^0$-UV System

These experiments were designed to investigate the chemical reduction of perchlorate in $Fe^0$-UV system under anoxic conditions. Deionized water was used after degassing with a vacuum pump at pressure gauges of 40–50 cm and purging with $N_2$ gas to make anoxic conditions. Solutions of perchlorate were prepared at 0.8 L quartz reactor with varying iron concentrations and pH values. The iron concentration range was between 10 g/L–100 g/L. The initial pH range was kept between 5.0 and 8.0, a range most common for natural waters. Dilute HCl and NaOH solutions were used to adjust the pH of the test solutions.

The $Fe^0$—$ClO_4^-$ solution was continuously mixed by a MASTERFLEX hydraulic pump to provide sufficient contact between iron metal and perchlorate. During the experiment, the samples were taken from the reactor at specific times from a sampling port. The samples were filtered to remove iron particles. A portion of samples was used for ion chromatography analysis, and the remainder was used to measure pH.

Experiments with FeOOH—$H_3PO_4$ System

Deionized water was degassed by using a vacuum pump at pressure gauges of 40–50 cm Hg vacuum, and with a magnetic stirrer and purged with $N_2$ gas for approximately 1 hour to make anoxic conditions. Solutions of perchlorate were prepared in a 0.8 L glass reactor with varying FeOOH concentrations. An adequate amount of $H_3PO_4$ was added to the solution to adjust the pH from 2 to 4.5, and the reactor was filled with water and leaving no void space. The solution was mixed by using magnetic stirrer. During the experiment, the samples were taken from the reactor at specific times from a sampling port. The samples were filtered to remove FeOOH particles. A portion of samples was used for ion chromatography analysis, and the remainder was used to measure pH.

Experiments with $Fe^0$—$H_3PO_4$ System

The experiments with the $Fe^0$—$H_3PO_4$ system are equivalent procedurally with the $Fe^0$-UV experimental system except that a photochemical reactor was not used in these experiments. An adequate amount of $H_3PO_4$ was added to the perchlorate solution to adjust the pH from 2 to 4.5.

Analytical Methods

The analytical method used AS11 analytical and AG11 guard columns, and a conductivity detector and an anion trap column (ATC) to remove anionic contaminants from the eluent. Since conventional analytical methods have difficulties in separating chloride ($Cl^-$), chlorite ($ClO_2^-$), and perchlorate ($ClO_3^-$) ions from each other (Wirt et al. *American Environmental Laboratory* 10 (3) (1998): 4–5), a modified analytical method is used by changing the eluent mode from isocratic to gradient mode in order to check the feasibility of chemical reduction of perchlorate.

The modified method used gradient mode, in which 10 mM NaOH was used for 0 through 7 minutes to separate $Cl^-$, $ClO_2^-$, $ClO_3^-$, and 100 mM NaOH was used for 7 through 20 minutes to detect perchlorate with reasonable retention time. In order to quantify perchlorate at low μg/L levels, it is essential to optimize chromatographic conditions in terms of retention time, peak shape, and baseline noise. The use of AS11 column with an eluent of 100 mM sodium hydroxide permits the elution of perchlorate within a reasonable time frame. In order to minimize baseline noise for this application, it was necessary to operate the suppressor at 300 mA in the external water mode. A 100 μL sample loop was used to minimize the effect of void volume inside the reactor for the experiment. Flow rate of 1 mL/min was used.

All the working eluents were prepared in degased deionized water. A 50% w/w sodium hydroxide solution (Fisher Scientific) is used to prepare eluent. Sodium chloride (NaCl; Fisher Scientific), sodium hypochlorite (NaOCl; available chlorine 10~13%; Aldrich Chemical Co.), sodium chlorite ($NaClO_2$, 80%; Aldrich Chemical Co.), sodium perchlorate ($NaClO_3$, 99%; Aldrich Chemical Co.), and sodium perchlorate ($NaClO_4$, 99%; Aldrich Chemical Co.) were used for the calibration of oxychlorine species.

Calibrations are carried out with working standards of all oxychlorine anions prepared in deionized water. Working standards were injected into an ion chromatography machine to produce calibrations.

Perchlorate Removal By $Fe^0$ $Fe^0$-UV Systems

EXAMPLE 1

Removal of perchlorate ion was achieved with iron metal. FIG. 2.0 shows the results of perchlorate chemical reduction obtained by $Fe^0$. Perchlorate ion concentration in the water fell over time with the higher starting concentration of iron metal. The amount of iron metal used is a limiting factor for perchlorate reduction as follows:

$$Fe^0 + ClO_4^- + 2H^+ \rightarrow ClO_3^- + Fe^{2+} + H_2O$$

$$4Fe^0 + ClO_4^- + 8H_+ \rightarrow Cl^- 4 + Fe^{2+} + 4H_2O$$

The direct role of $Fe^0$ as a reactant in the equations above implies the involvement of reactive sites on the metal surface and, therefore, that the condition and quantity of the metal surface in a reaction system should strongly influence the rate of perchlorate chemical reduction. In the presence of 100 g/L of iron (100 mesh), 37% of perchlorate reduction occurred within 3 hours and $\Delta pH$ ($\Delta pH = pH_f - pH_0$) is 1.59 with $pH_0$ of 6.35, without pH control.

EXAMPLE 2

Removal of perchlorate from water was conducted with a $Fe^0$-UV system. Different experiments were done in this manner with varying concentrations of iron metal. FIG. 3.0 shows the effects of the $Fe^0$-UV system on perchlorate chemical reduction with varying iron metal concentration. In the presence of 100 g/L of iron (100 mesh) and UV, 76.7% of perchlorate was eliminated from the water within 5 hours with irradiation and $\Delta pH$ is 1.92 with $pH_0$ of 6.61, without pH control. It is apparent that UV light acts as a catalyst which makes the reaction faster or UV light acts an energy input which makes perchlorate excite.

EXAMPLE 3

This experiment was carried out by varying the intensity of UV light in the $Fe^0$-UV system. The effect of light intensity on perchlorate reduction in the $Fe^0$-UV system over the experimental period is shown in FIG. 4.0. The light intensity has been measured by ISV Radiometer (manufactured by UVP, Inc.), which reads the intensity of the incident light into a specified dosimeter surface. The results of FIG. 4.0 shows that overall UV light intensity directly influences the amount of perchlorate that can be removed from water by chemical reduction.

EXAMPLE 4

Initial pH in the $Fe^0$-UV system was varied to examine acidic and basic effects on perchlorate concentration. The effect of initial pH on perchlorate removal in the $Fe^0$-UV system is shown in FIG. 5.0. It is noted that the first of the pH values in the legend is the initial pH of the reaction while the second pH value is the final pH when the reaction is stopped. Effective removal of perchlorate ion was achieved with a starting pH as low as 6.24 and an ending pH as high as 8.53. The basic pH may favor the formation of iron hydroxide (precipitates), which may eventually form a surface layer on the metal that inhibits its further dissolution.

Perchlorate Removal by $FE^0$—$H_3PO_4$ and FEOOH—$H_3PO_4$ Systems

EXAMPLE 5

The effect of phosphoric acid on perchlorate removal with iron metal was studied. The $Fe^0$—$H_2O$—$ClO_4^-$ system in the presence of phosphoric acid was capable of removing perchlorate drastically during initial phase of contact as shown in FIG. 6.0. With the passage of time, the pH increased and less perchlorate ion could be removed as indicated by an increase in chlorate ion concentration. The initial pH of the experiment was 5.9 before addition of phosphoric acid, and after addition, the pH was 2.0. The pH increased from 2.0 to 3.5 over the two hour period. The pH increase may result from dissolution of iron metal under acidic conditions to ferrous ion or the reduction of water. The loss in ability to remove perchlorate ion with increasing time and pH suggested that perchlorate ion-phosphoric acid complexes were desorbing from the metal.

EXAMPLE 6

Figure 6:
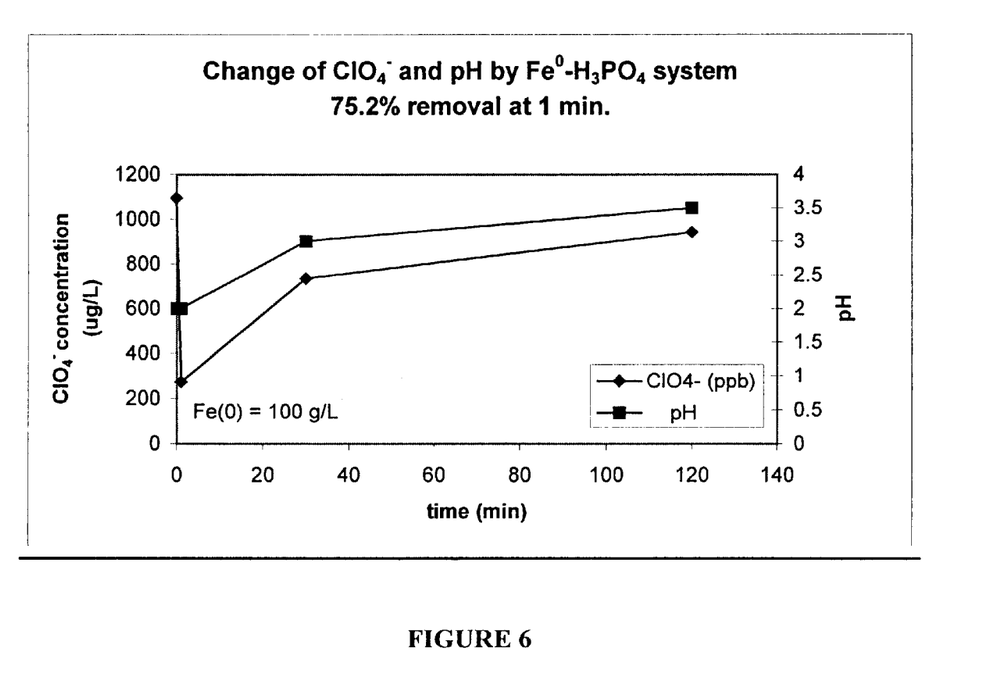
Figure 7:
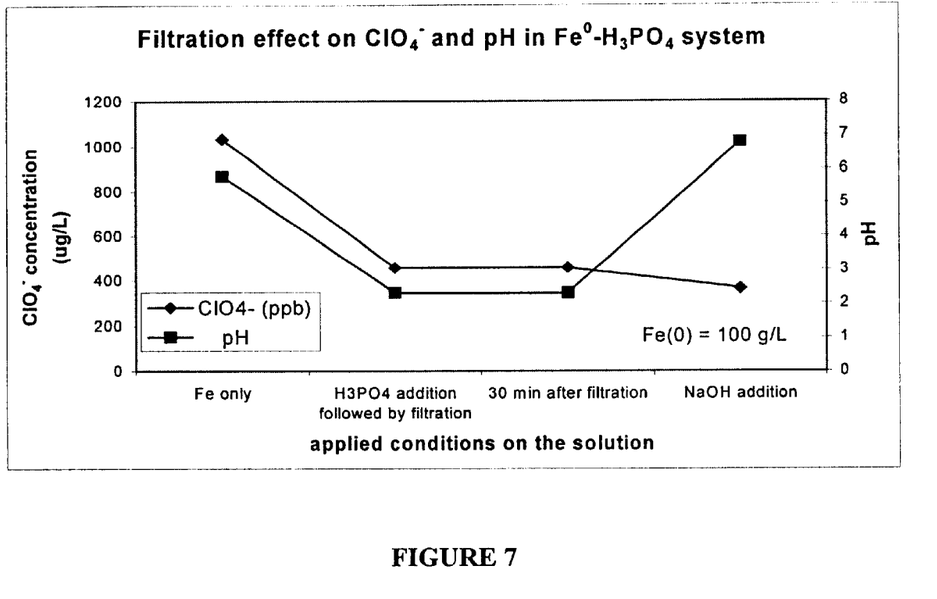
Figure 8:
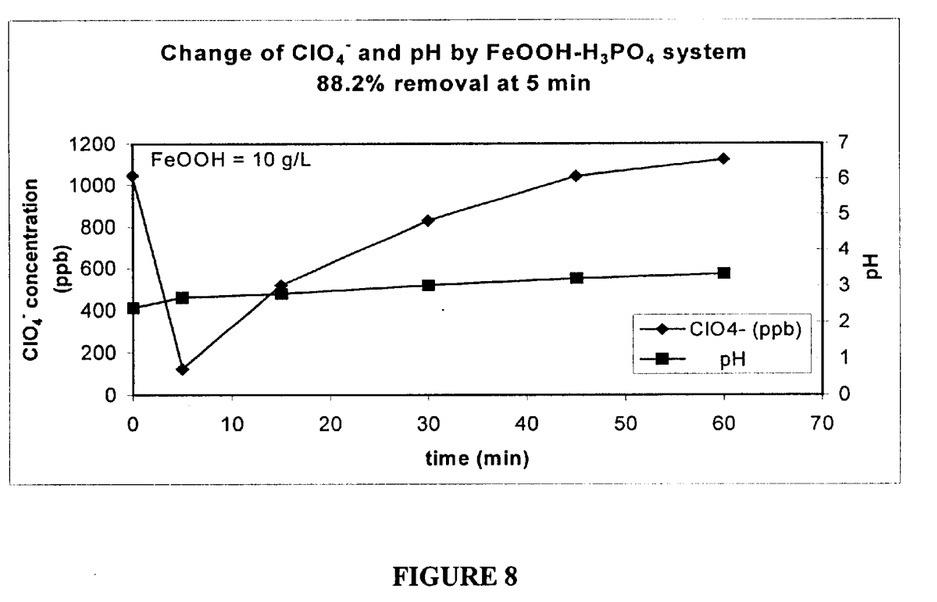
Figure 9:
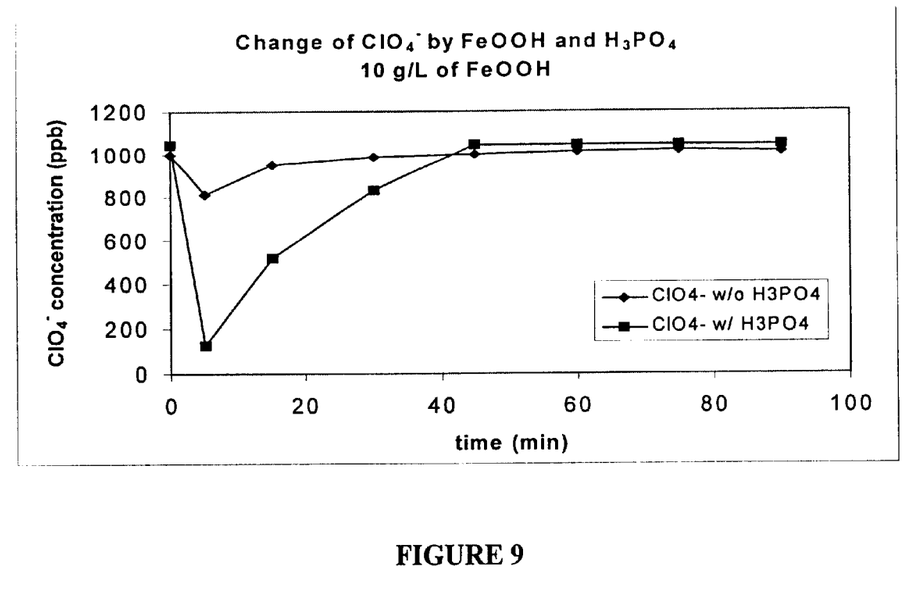

To prove rapid formation of a complex between phosphoric acid and perchlorate ion, iron was filtered after a one minute reaction. As shown in FIG. 7.0, 100 g/L of $Fe^0$ added to perchlorate containing water did not detectably affect the perchlorate concentration (left portion of FIG. 7.0). However, filtration one minute after addition of $H_3PO_4$ to perchlorate containing water significantly reduced perchlorate ion concentration of the solution. In contrast to FIG. 6, the post iron filtrate did not show any increase in perchlorate ion in solution after 30 minutes time or after addition of NaOH to raise the pH to the about that of the starting water. The results from FIG. 6.0 and FIG. 7.0 show that a decrease in perchlorate concentration was achieved through complex formation between perchlorate and phosphoric acid followed by adsorption of perchlorate to the iron metal surface.

EXAMPLE 7

Iron oxide, FeOOH, was tested as a substitute for iron metal in the presence of phosphoric acid. As shown in FIG. 8.0, perchlorate was effectively bound to the iron oxide during the initial stage of contact and was removed from the solution by removal of the iron oxide. An initial concentration of 1000 μg/L of perchlorate could be reduced about 10 fold by this process to about 100 ug/L perchlorate (88% removal) during the initial phases of contact.

EXAMPLE 8

The effect of phosphoric acid on the ability of perchlorate to bind to iron oxide was evaluated. Perchlorate adsorption on FeOOH in the absence of phosphoric acid is very minimal, as shown in FIG. 9.0. However, perchlorate removal increases to 90% in the presence of phosphoric acid.

EXAMPLE 9

Solutions with lower starting concentrations of perchlorate, i.e., 200 and 500 g/L, were evaluated for efficiency of removal in the FeOOH—$H_3PO_4$ system. All initial conditions were the same as for Example 7 and 8 (FeOOH=25 g/L, and $pH_0$=2.0) except for the starting $ClO_4^-$ concentration. The results are shown in FIG. 10.0. The perchlorate removal efficiency varied from 69.0% for 200 g/L to 74.9% for 500 g/L. The pH change pattern was the same for all the samples. These results indicate that the FeOOH—$H_3PO_4$ system for removing perchlorate works well at a variety of starting perchlorate concentrations.

What is claimed is:

1. A method for removing perchiorate ions from water, comprising the steps of: contacting the water containing peroclorate ions with an effective amount of iron metal to remove perchiorate ions; and irradiating the water with an effective amount of UV light to remove perchlorate ions at a pH of between 5.0 and 8.0 under substantially anoxic conditions.

2. A method according to claim 1, further comprising the step of removing said iron metal from the water following chemical reduction of perchlorate.

3. A method according to claim 1, wherein said effective amount of iron metal is about 10 g/L to about 100 g/L.

4. A method according to claim 1, wherein said step of contacting the water with iron metal further includes contacting with a catalyst.

5. A method according to claim 1, wherein said step of contacting the water with iron metal is performed at a pH of about 6 to about 8.

6. A method according to claim 1, wherein said step of contacting the water with iron metal is performed at a pH of about 6.2 to about 7.5.

7. A method according to claim 1, wherein said iron metal is in the form of a powder.

8. A method for removing permkorate ions from water, comprising the steps of:
   (a) contacting the water containing perchlorate ions with an iron mow or a metal oxide, and with phosphoric acid, under conditions suitable for the perchloree ions to adsorb to the iron metal or the metal oxide, wherein the phosphoric acid is present at a ratio of >1:1 phosphoric acid to perchlorate ion; and
   (b) removing the iron metal or metal oxide with the perchlorate ion bound thereto from the water.

9. A method according to claim 8, wherein said metal oxide is iron oxide.

10. A method according to claim 9, wherein said iron oxide is FeOOH.

11. A method according to claim 8, wherein said iron metal or metal oxide is present in the water at a concentration of about 10 g/L to about 100 g/L.

12. A method according to claim 8, wherein said step of contacting water containing perchlorate ion with iron metal or metal oxide is performed under acidic conditions.

13. A method according to claim 12, wherein said acidic conditions is between about pH 2 to 4.5.

14. A method according to claim 8, wherein said phosphoric acid is present at a ratio between 1:1 to about 70:1 that of perchlorate ion.

15. A method according to claim 8, wherein removal of the iron metal or metal oxide in step (b) is performed within about 30 minutes after completion of step (a).

16. A method for removing perchlorate ions from water, comprising the steps of:
   (a) contacting the water containing perchiorate ions with phosphoric acid under conditions suitable to form a percblorate ion-phosphoric acid complex;
   (b) passing the water containing the perchlorate ion-phosphoric acid complex through a column packed with iron metal or metal oxide, wherein the perchlorate ion-phosphoric acid complex adsorbs to the iron metal or metal oxide; and
   (c) collecting the water after it passes through the column.

* * * * *

UNITED STATES PATENT AND TRADEMARK OFFICE
CERTIFICATE OF CORRECTION

PATENT NO.   : 6,531,065 B2
DATED        : March 11, 2003
INVENTOR(S)  : Mirat D. Gurol and Kyehee Kim It is certified that error appears in the above-identified patent and that said Letters Patent is hereby corrected as shown below:

<u>Column 11,</u>
Line 20, please change claim 1 as follows:

1. A method for removing perchlorate ions from water, comprising the steps of: contacting the water containing perchlorate ions with an effective amount of iron metal to remove perchlorate ions; and
    irradiating the water with an effective amount of UV light to remove perchlorate ions at a pH of between 5.0 and 8.0 under substantially anoxic conditions.

<u>Column 12,</u>
Line 1, please change claim 8 as follows:

8. A method for removing perchlorate ions from water, comprising the steps of:

(a) contacting the water containing perchlorate ions with an iron metal or a metal oxide, and with phosphoric acid, under conditions suitable for the perchlorate ions to adsorb to the iron metal of the metal oxide, wherein the phosphoric acid is present at a ratio of >1:1 phosphoric acid to perchlorate ion: and
  (b) removing the iron metal or metal oxide with the perchlorate ion bound thereto from the water.

UNITED STATES PATENT AND TRADEMARK OFFICE
CERTIFICATE OF CORRECTION

PATENT NO. : 6,531,065 B2
DATED : March 11, 2003
INVENTOR(S) : Mirat D. Gurol and Kyehee Kim

It is certified that error appears in the above-identified patent and that said Letters Patent is hereby corrected as shown below:

Column 12 cont'd,
Line 29, please change claim 8 as follows:

16. A method for removing perchlorate ions from water, comprising the steps of:
(a) contacting the water containing perchlorate ions with phosphoric acid under conditions suitable to form a percblorate ion-phosphoric acid complex;
(b) passing the water containing the perchlorate ion-phosphoric acid complex through a column packed with iron metal or metal oxide, wherein the perchlorate ion-phosphoric acid complex adsorbs to the iron metal or metal oxide; and
(c) collecting the water after is passes through the column.

Signed and Sealed this

Fifteenth Day of June, 2004

JON W. DUDAS
*Acting Director of the United States Patent and Trademark Office*